（12） United States Patent
Semba et al.

(10) Patent No.: US 10,138,857 B2
(45) Date of Patent: Nov. 27, 2018

(54) ENGINE STARTER SYSTEM (71) Applicant: MITSUBA Corporation, Gunma (JP)

(72) Inventors: Daisuke Semba, Gunma (JP); Noriyuki Aramaki, Gunma (JP); Ken Noguchi, Gunma (JP); Masayuki Okubo, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 0 days.

(21) Appl. No.: 15/735,317

(22) PCT Filed: Jun. 13, 2016

(86) PCT No.: PCT/JP2016/067497
§ 371 (c)(1),
(2) Date: Dec. 11, 2017

(87) PCT Pub. No.: WO2016/204109
PCT Pub. Date: Dec. 22, 2016

(65) Prior Publication Data
US 2018/0171959 A1 Jun. 21, 2018

(30) Foreign Application Priority Data
Jun. 17, 2015 (JP) .................................. 2015-122170

(51) Int. Cl.
*F02N 11/04* (2006.01)
*F02N 11/08* (2006.01)
(Continued)

(52) U.S. Cl.
CPC .............. *F02N 11/04* (2013.01); *F02N 11/08* (2013.01); *F02N 11/0859* (2013.01);
(Continued)

(58) Field of Classification Search
CPC .. F02N 11/04; F02N 11/0859; F02N 11/0814; F02N 11/0848; F02N 11/0855;
(Continued)

(56) References Cited

U.S. PATENT DOCUMENTS

| 5,327,069 A * | 7/1994 | Radun | H02K 21/44 |
| | | | 318/400.13 |
| 6,442,535 B1 * | 8/2002 | Yifan | H02P 25/08 |
| | | | 310/165 |

(Continued)

FOREIGN PATENT DOCUMENTS

| JP | 58-176569 | 11/1983 |
| JP | 2001-28851 | 1/2001 |

(Continued)

OTHER PUBLICATIONS

International Preliminary Report on Patentability dated Dec. 21, 2017 in International (PCT) Application No. PCT/JP2016/067497.
(Continued)

*Primary Examiner* — Long T Tran
(74) *Attorney, Agent, or Firm* — Wenderoth, Lind & Ponack, L.L.P.

(57) ABSTRACT

A rotor of a starter that employs an SR motor is directly connected to a crank shaft of an engine. The rotor and the crank shaft are set in such a way that when a piston is positioned at a top dead center or the like, salient poles and of the rotor face U-phase poles, so that an output torque of the starter comes to its maximum at a maximum pass-over torque position of the engine. When the engine is stopped, electricity is supplied through U-phase coils, thereby making the salient poles and the U-phase poles stop so as to face each other. In this manner, the piston is stopped at the maximum pass-over torque position. When the engine is started, electricity is supplied to W-phase coils which are adjacent to the U-phase coils, thereby making it possible to
(Continued)

overcome a maximum friction torque with maximum outputs.

7 Claims, 4 Drawing Sheets

(51) Int. Cl.
*H02K 7/18* (2006.01)
*H02K 1/24* (2006.01)
(52) U.S. Cl.
CPC .............. *H02K 1/246* (2013.01); *H02K 7/18* (2013.01); *H02K 7/1815* (2013.01); *F02N 2300/104* (2013.01); *Y02T 10/48* (2013.01)
(58) Field of Classification Search
CPC .......... H02K 1/145; H02K 7/06; H02K 11/21; H02K 16/04; H02K 19/103; H02K 1/146; H02K 37/04; H02K 3/325; H02K 47/20; H02K 51/00
See application file for complete search history.

(56) References Cited

U.S. PATENT DOCUMENTS

| | | | |
|---|---|---|---|
| 2003/0062869 A1* | 4/2003 | Ieoka | F04B 27/0895 318/701 |
| 2003/0107348 A1 | 6/2003 | Inagawa et al. | |
| 2004/0168664 A1 | 9/2004 | Senda et al. | |
| 2005/0072608 A1* | 4/2005 | Johnston | B60K 6/26 180/65.245 |
| 2005/0253393 A1 | 11/2005 | Senda et al. | |
| 2008/0054835 A1* | 3/2008 | Tamaru | H02P 25/08 318/634 |
| 2008/0302628 A1* | 12/2008 | Kimura | F16H 63/3433 192/220 |
| 2009/0091866 A1* | 4/2009 | Inoue | F16H 61/12 361/23 |
| 2012/0291739 A1 | 11/2012 | Hashimoto et al. | |
| 2013/0314013 A1* | 11/2013 | Ajima | H02P 23/00 318/400.21 |
| 2017/0187315 A1* | 6/2017 | Deguchi | H02P 25/098 |

FOREIGN PATENT DOCUMENTS

| | | |
|---|---|---|
| JP | 2003-189675 | 7/2003 |
| JP | 2004-308645 | 11/2004 |
| JP | 2012-241562 | 12/2012 |

OTHER PUBLICATIONS

International Search Report dated Aug. 9, 2016 in International (PCT) Application No. PCT/JP2016/067497.

* cited by examiner

ENGINE STARTER SYSTEM

TECHNICAL FIELD

The present invention relates to an engine starter system using an electric motor.

BACKGROUND ART

To start an engine, an engine starter using an electric motor has heretofore been used. For example, Patent Document 1 discloses an engine starter/generator that use an SR motor (Switched Reluctance Motor). In recent years, as an engine-starter motor, SR motors whose structure is simple and solid has gained attention. Especially, the use of SR motors is expanding against the backdrop of a surge in the prices of rare earths, as the motors do not employ permanent magnets in rotors. In the case of the starter/generator disclosed in Patent Document 1, the rotation shaft of a motor is connected to the crankshaft of an engine via a clutch or reducer; The starter/generator functions as a starter (power machine) when an engine is being stopped, and as a generator (power generator) after the start of the engine.

PRIOR ART DOCUMENT

Patent Document

Patent Document 1: JP 2001-28851A

SUMMARY OF THE INVENTION

Problems to be Solved by the Invention

Meanwhile, the engine has a rotation friction, which further has periodic fluctuations (ripples). Accordingly, when the engine is started, the torque for rotating the crankshaft (cranking torque) differs according to where a piston is inside a cylinder. In the case of a conventional starter motor using a magnet rotor, a surplus output power of the motor is used to address the ripples of the engine friction torque.

However, a drive-source electric motor, too, has torque ripples. Particularly, the SR motor tends to have larger torque ripples than magnet motors. As described above, in the case of the conventional engine starter, the engine-side torque ripples are addressed by the surplus output power, while the motor's torque ripples are somewhat left out of consideration. If the motor's and engine's torque ripples work against each other, the engine may not start as the motor torque is overwhelmed by the cranking torque.

Figure 4:
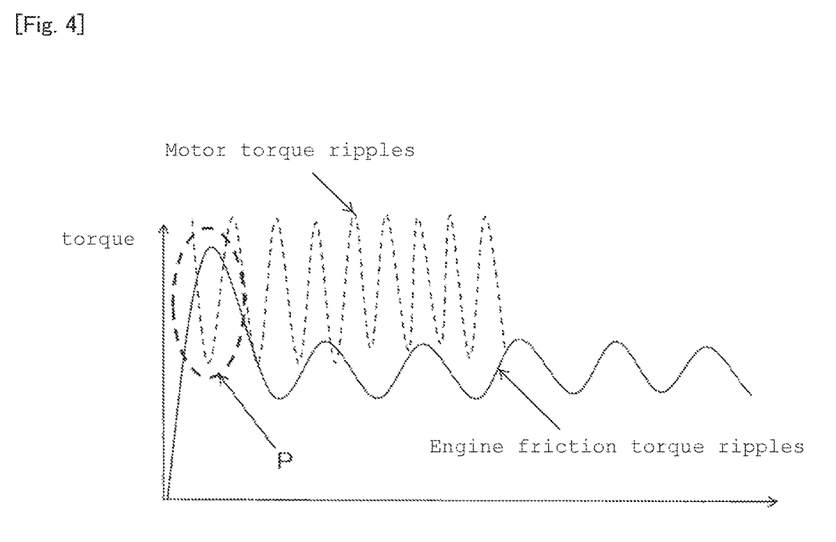
FIG. 4 is an explanatory diagram showing the relationship between motor's torque ripples and ripples of engine friction torque.

As indicated in area P in FIG. 4, if the peak of the ripple of engine friction torque coincides with the trough of the ripple of motor torque, the motor torque may be less than the cranking torque as long as it depends on the surplus output power. That is, the motor torque may not be able to exceed a pass-over torque (maximum pass-over torque) at a time when it passes over the top dead center of the first compression stroke since the engine's start (which is a compression stroke of a four-cycle engine or a suction/compression stroke for a two-cycle engine) and could result in malfunction. In this case, such concerns would not rise if the trough of the motor torque is set in such a way as to surpass the peak of the engine friction torque. However, the problem is that increasing the motor torque inevitably requires the motor to be larger in size.

Means for Solving the Problems

According to an aspect of the present invention, there is provided an engine starter system for starting an engine using an electric motor, wherein the electric motor includes a stator, which has a plurality of poles and coils wound around each of the poles, and a rotor, which is disposed in such a way as to share an axis with the stator; the rotor is connected to a crank shaft of the engine and rotates in sync with the crank shaft; and the rotor and the crank shaft are connected together in such a way that when a piston of the engine is at a top dead center or slightly beyond the top dead center, a predetermined pole faces a predetermined location of the rotor.

In the present invention, the positional relationship between the piston and the rotor is mechanically set in such a way that when the piston of the engine is at the top dead center or slightly beyond the top dead center, a predetermined pole comes to face a predetermined location of the rotor. When the piston of the engine is at the top dead center or slightly beyond the top dead center, the friction torque comes to its maximum when the engine is started. Accordingly, it is possible to overcome a maximum friction torque with maximum output, and the engine therefore can be started by a minimum-output motor.

In the engine starter system, when the engine is stopped, electricity may be supplied to a predetermined coil, and a predetermined location of the rotor is therefore stopped to face the predetermined pole, and the piston is stopped at a top dead center or slightly beyond the top dead center. When the engine is started, electricity may be supplied to the coil that is different from the coil through which electricity is supplied when the engine is stopped, in order to drive the electric motor.

The poles are mounted in such a way as to protrude toward a radial-direction inner side of the stator; the rotor has a plurality of salient poles protruding toward a radial-direction outer side; and when the piston of the engine is at a top dead center or slightly beyond the top dead center, a predetermined salient pole faces a predetermined pole. In this case, the coils are phase coils of multiple phases through which currents of different phases are supplied; and when the engine is stopped, electricity is supplied to one phase of the phase coils so that the predetermined salient pole is stopped facing the predetermined pole, thereby letting the piston stop at a top dead center or slightly beyond the top dead center. When the engine is started, electricity is supplied to an adjacent phase coil of a different phase from the phase coil through which electricity is supplied when the engine is stopped, in order to drive the electric motor.

According to another aspect of the present invention, there is provided an engine starter system for starting an engine using an electric motor, wherein the electric motor includes a stator, which has a plurality of poles and coils wound around each of the poles, and a rotor, which is disposed in such a way as to share an axis with the stator; the rotor is connected to a crank shaft of the engine and rotates in sync with the crank shaft; and the rotor and the crank shaft are connected in such away that an output torque of the electric motor comes to its maximum at a maximum pass-over torque position of the engine.

In the present invention, the positional relationship between the piston and the rotor is mechanically set in such a way that when the friction torque is at its maximum during the process of starting the engine, the output of the motor comes to its maximum as well. Therefore, it is possible to overcome a maximum friction torque with maximum output, and the engine therefore can be started with a minimum-output motor.

In the engine starter system, when the engine is stopped, electricity is supplied to a predetermined coil to make the rotor stop at a position corresponding to a maximum pass-over torque position of the engine. When the engine is started, electricity is supplied to the coil that is different from the coil to which electricity is supplied when the engine is stopped, in order to drive the electric motor.

The coils are phase coils of multiple phases through which currents of different phases are supplied; and when the engine is stopped, electricity is supplied to one phase of the phase coils so that the rotor comes to a halt at a position corresponding to a maximum pass-over torque position of the engine. When the engine is started, electricity is supplied to the phase coil of a different phase from the phase to which electricity is supplied when the engine is stopped, so that an output torque of the electric motor comes to its maximum, in order to drive the electric motor.

Advantages of the Invention

In an aspect of the engine starter system of the present invention, the positional relationship between the piston and the rotor is set in such a way that when the piston of the engine is at the top dead center or slightly beyond the top dead center, a predetermined pole faces a predetermined location of the rotor. As a result, it is possible to overcome the top dead center-position, where the friction torque is at its maximum when the engine is started, with the maximum output of the motor. Accordingly, the engine can be started by a minimum-output motor, the engine starter can be reduced in size, and the reliability of the system can be improved.

In another aspect of the engine starter system of the present invention, the positional relationship between the piston and the rotor is set in such a way that an output torque of the electric motor comes to its maximum at a maximum pass-over torque position when the engine is started. As a result, it is possible to overcome the maximum pass-over torque when the engine is started, with the maximum output of the motor. Accordingly, the engine can be started by a minimum-output motor, the engine starter can be reduced in size, and the reliability of the system can be improved.

BRIEF DESCRIPTION OF THE DRAWINGS

FIGS. 3A and 3B are flowcharts showing a control procedure of the engine starter system.

EMBODIMENTS FOR CARRYING OUT THE INVENTION

Figure 1:
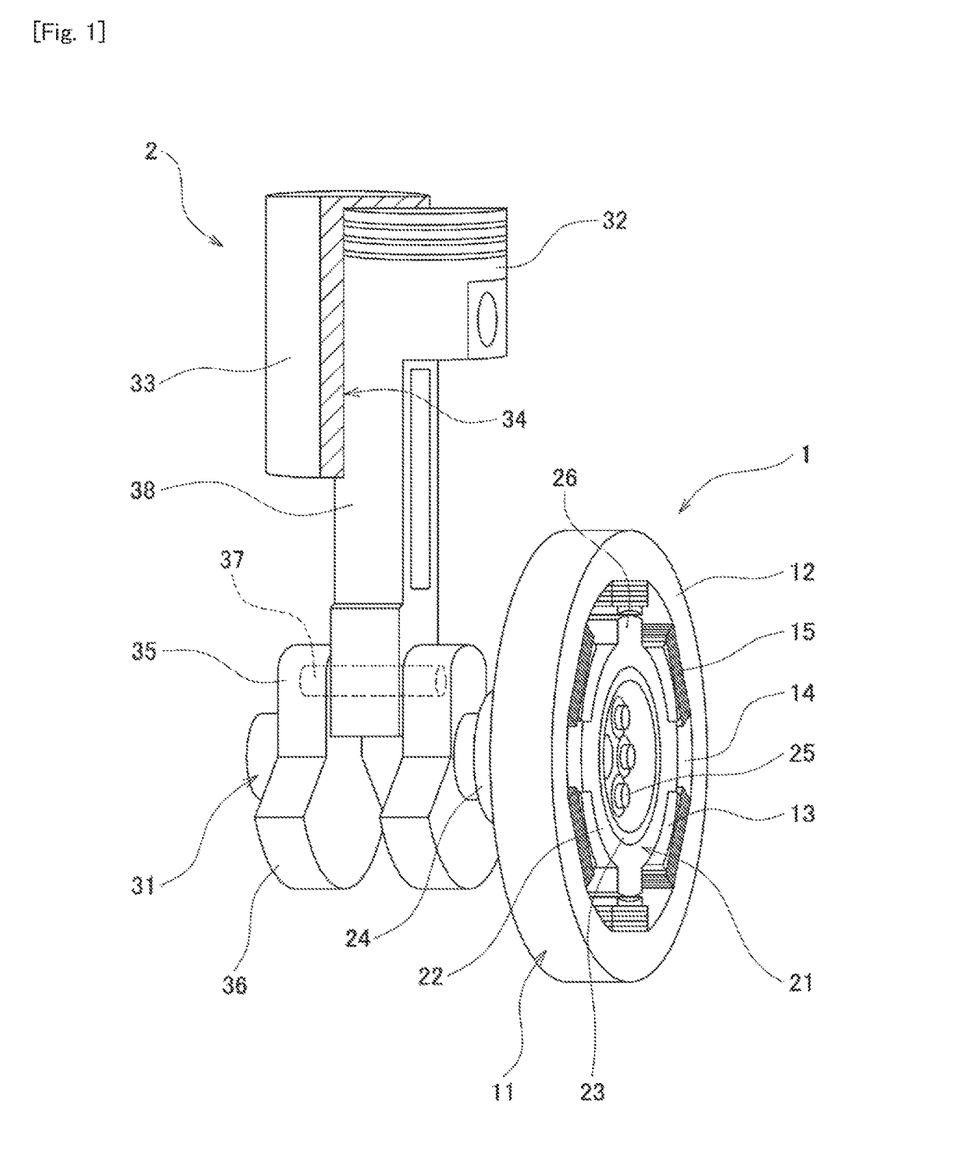
FIG. 1 is an explanatory diagram showing the configuration of an engine starter system according to one embodiment of the present invention.

Hereinafter, an embodiment of the present invention will be described based on the accompanying drawings. The object of the embodiment described below is to provide an engine starter system capable of reliably starting an engine with a minimum-output motor. FIG. 1 is an explanatory diagram showing the configuration of an engine starter system according to one embodiment of the present invention. The engine starter system of FIG. 1 includes a starter 1, which employs an SR motor or a type of brushless motor, and an engine 2, which is started by the starter 1. Incidentally, in the present embodiment, in order to make the system configuration easier to understand, the engine is constituted of a single cylinder, and peripheral members such as cylinder blocks and motor cases, are omitted from FIG. 1.

The starter 1 is an inner rotor-type electric motor. The starter 1 includes a stator 11, which is secured inside the motor case not shown in the diagram, and a rotor 21, which is disposed inside the stator 11 in a rotatable manner. The stator 11 is made up of a large number of thin electromagnetic steel plates that are stacked. The stator 11 includes a ring-shaped yoke 12 and poles 13. The poles 13 are radially protruding from the yoke 12 toward the radial-direction inner side (toward the center). The gap between the adjacent poles 13 serves as a slot 14. In the stator 1, the poles 13 and the slots 14 are formed in such a way as to be the same in size (with the same central angle). Six poles 13 are disposed along the circumferential direction in such a way as to be spaced apart from one another at regular intervals.

On the outer periphery of the pole 13, a coil 15 is wound. To the coils 15, currents are supplied from a battery under the control of an engine controller. The coils 15 are multiple phase coils (or three pairs of U-phase, V-phase and W-phase coils 15U, 15V and 15W in this case), to which currents of different phases are supplied. The coils 15 that face each other have the same phase. Currents are sequentially supplied to the three pairs of coils 15, thereby forming rotating magnetic fields of three phases (U-phase, V-phase and W-phase) inside the stator 1.

Inside the stator 11, the rotor 21 is inserted in such a way as to share the axis with the stator 11 and be capable of rotating relative to the stator 11. The rotor 21 is directly connected to a crank shaft 31 of the engine 2 and therefore rotates together with the crank shaft 31. The rotor 21 includes a rotor core 22 and a rotor body 23, which is fixed to the inner side of the rotor core 22. The rotor core 22 is made up of a large number of thin electromagnetic steel plates that are stacked. The rotor body 23 is fixed to a crank journal 24 with attachment bolts 25. The crank journal 24 is formed in an end portion of the crank shaft 31. The crank journal 24 is supported by main bearings (not shown) in a rotatable manner on a cylinder block. On the outer periphery of the rotor core 22, salient poles 26 are disposed protruding toward the radial-direction outer side. The four salient poles 26 are equally spaced out along the circumferential direction. The salient poles 26 are of the same size as the poles 13 and slots 14 (with the same central angle).

In the starter 1, the rotation angle of the rotor 21 is detected by a resolver (not shown). The engine controller sequentially excites each phase coil 15U, 15V or 15W in accordance with the angular position of the rotor 21. When a coil 15 is excited, a pole 13 where that coil 15 is wound around starts acting as a magnetic pole, thereby forming a rotating magnetic field in the stator 1. The salient pole 26 of the rotor 21 is attracted by the magnetized pole 13, and the rotor 21 starts to rotate inside the stator 11 as a result.

The engine 2 has a piston 32, which is connected to the crank shaft 31. The piston 32 is disposed in a cylinder bore 34, which is formed in a cylinder block 33. The position of the piston 32 inside the cylinder bore 34 is constantly detected by a piston position sensor (not shown). The crank shaft 31 is provided with crank arms 35 and counter weights 36. Between the crank arms 35, a crank pin 37 is attached. To the crank pin 37, a connecting rod 38 is attached to link the piston 32 and the crank shaft 31. When the engine is started, the starter 1 causes the crank arms 35 to rotate, thereby moving the piston 32 up and down. At the same time, fuel is injected into the cylinder bore 34 so that combustion and explosions occur appropriately. In this manner, the engine 2 is started.

In this engine starter system, the positional relationship between the rotor 21 and the crank shaft 31 is set so that a rotor rotation position where the torque of the starter 1 is at its maximum matches a crank shaft rotation position where engine friction torque is at its maximum. That is, the starter 1 and the engine 2 are mechanically set in such a way that the peaks of respective torque ripple waveforms match each other.

Figure 2:
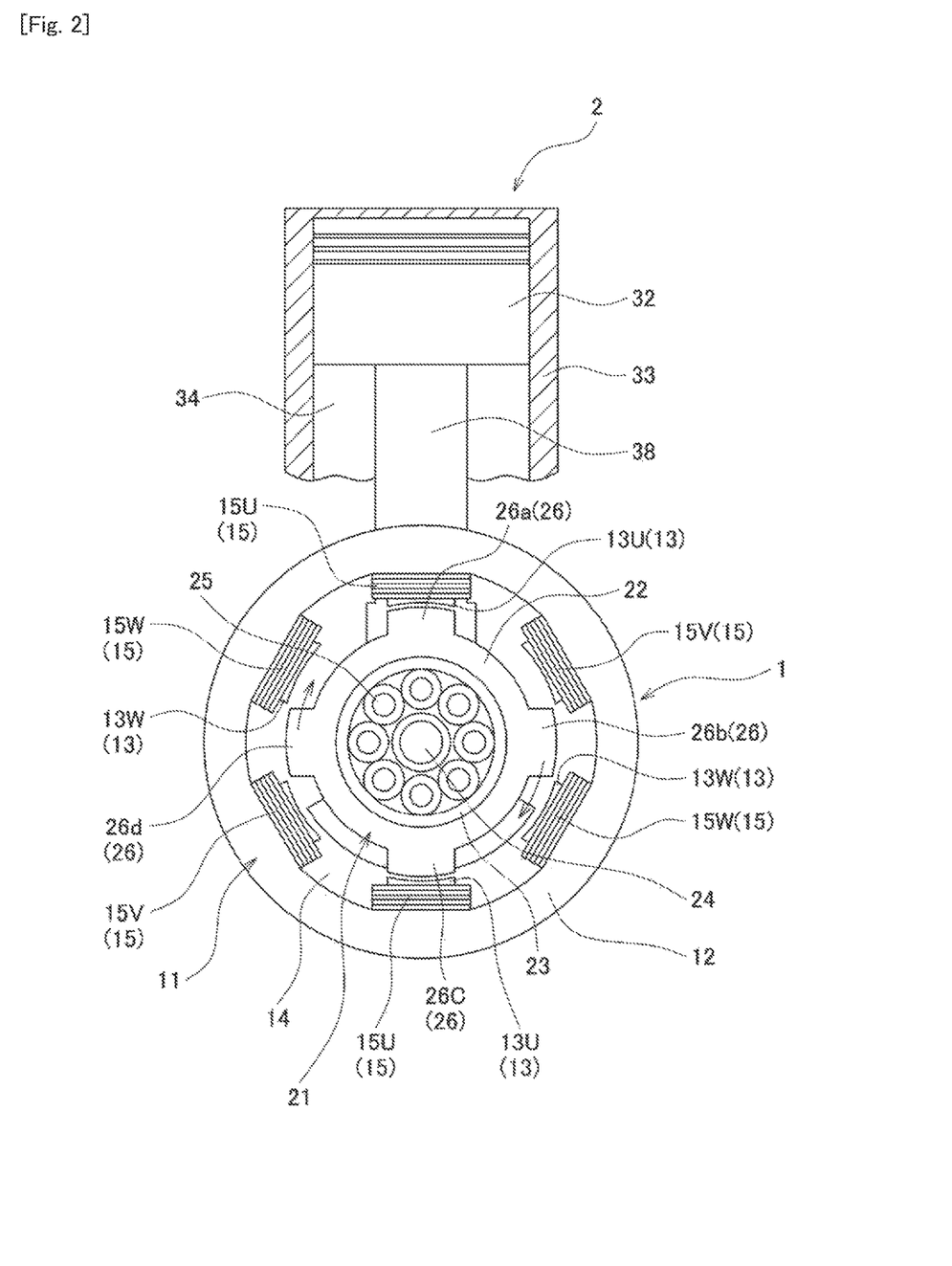
FIG. 2 is an explanatory diagram showing the positional relationship between a rotor and a piston in the engine starter system of FIG. 1.

Generally, the engine friction torque is at its maximum when the piston 32 is positioned at the top dead center, which is a maximum pass-over torque position. Meanwhile, the output torque of the starter 1 is at its maximum when, as shown in FIG. 2, a pair of salient poles 26 (26a, 26c) face poles 13 (e.g. U-phase poles 13U) and the other pair of salient poles 26 (26b, 26d) are between the adjacent poles 13. At this time, if the poles 13 (similarly, W-phase poles 13W) of the starter 1 are excited, the largest attraction force acts on the salient poles 26b and 26d, whereby the starter 1 rotates with maximum torque.

Accordingly, in the starter 1, the rotor 21 is mounted on the crank shaft 31 so that the rotor 21 is in the situation shown in FIG. 2 at a time when the piston 32 is at the top dead center-position or slightly beyond the top dead center-position (those positions will be referred to as "top dead center-position or the like"). Therefore, in the engine starter system of the present invention, the engine can be started with the motor's maximum torque, and an efficient engine start operation is possible without relying on surplus output power. Accordingly, in this system, even if an SR motor, which has large torque ripples, is used, malfunctioning does not occur, such as not being able to exceed a maximum pass-over torque. As a result, it is possible to reliably start the engine with a minimum-output motor, as well as to make the starter 1 smaller and improve the reliability of the system.

Figure 3A:
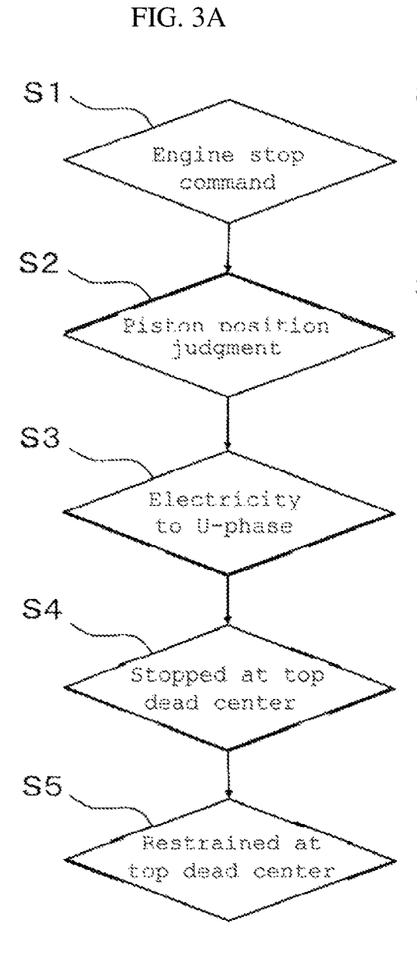
FIG. 3A shows a state of the system being stopped.
Figure 3B:
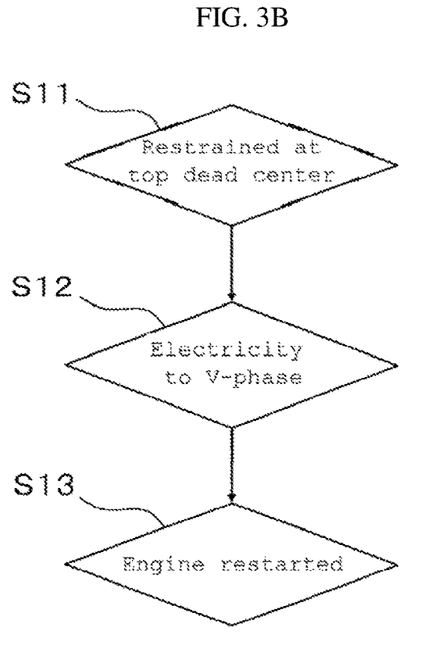
FIG. 3B shows a state of the system being restarted.

In the engine starter system with the above-described configuration, in order to make best use of its structural advantages, motor control is conducted as follows. FIG. 3 is a flowchart showing the control procedure of the engine starter system: FIG. 3A shows the system being stopped, and FIG. 3B shows the system being restarted. The present embodiment is based on the assumption that the engine of an idling-stopped vehicle is being restarted. As shown in FIG. 3, when a vehicle comes to a stop, the engine controller issues an engine stop command (Step S1). Then, the position of the piston 32 is detected and judged (Step S2).

The engine controller, which issued the engine stop command, sends electricity only through the U-phase coils of the starter 1 after the piston 32 comes close to the top dead center-position (Step S3). As a result, the starter 1 stops with the salient poles 26a and 26c facing the U-phase poles 13U. As described above, the starter 1 is set in such a way that, when the salient poles 26a and 26c face the U-phase poles 13U, the piston 32 is at the top dead center-position or the like (Step S4). Accordingly, the rotor 21 is stopped and restrained with the piston 32 at the top dead center-position or the like (Step S5).

When the engine is restarted, from the top dead center-position restraining state (from Step S5 to S11), electricity is being supplied only through W-phase coils (Step S12), which are adjacent to the U-phase coils (or adjacent to the U-phase coils on the side opposite to the rotor rotation direction) and differ in phase. As a result, the salient poles 26b and 26d are attracted by the W-phase poles 13W, and the starter 1 rotates with maximum torque (the state shown in FIG. 2). That is, the engine is started with the maximum torque of the starter 1 when the engine is at the engine friction torque maximum position (top dead center). Accordingly, it is possible to reliably start the engine by making maximum use of the motor output. After that, different coils are sequentially excited, and the rotor 21 is rotated to start the engine (Step S13).

In this manner, in the engine starter system of the present invention, the positional relationship of the piston with the rotor is mechanically set in such a way that when the friction torque is at its maximum during the process of starting the engine, the motor's output comes to its maximum. Moreover, preparations for restart is also made when the engine is stopped: Electricity is supplied only to one predetermined phase so that the rotor is stopped and retained at a position where the motor's output is at its maximum (where the friction torque is at its maximum as well). That is, standby control is conducted by simply supplying electricity through the one phase, so that when the engine comes to a halt, the rotor is placed at the best position for restart next time. When the engine is started, this allows the motor to be driven with maximum torque only by supplying electricity to the adjacent, next phase, and the maximum friction torque can be exceeded with maximum output. Therefore, unlike conventional systems that are dependent on surplus output power, a motor of optimal output and size can be used for the engine, and the engine starter can be reduced in size and the reliability of the system can be improved.

The present invention is not limited to the above-described embodiment, and various changes may be made without departing from the spirit of the invention.

For example, in the above-described embodiment, the system according to the present invention is applied to the single-cylinder engine. This system can also be applied to engines of multiple cylinders, such as four-cylinder and six-cylinder. In multiple-cylinder engines, fluctuations of engine friction torque are smaller than in the single-cylinder engine. But there are still ripples, which are a combination of torque ripples of each cylinder. In accordance with the characteristics of each engine, the crank shaft position where the combined ripples are at their maximum is matched with the maximum torque position of the starter 1. This similarly enables the efficient, reliable start of the engine.

In the above-described embodiment, the settings are made in such a way that when the salient poles 26 face the U-phase poles 13U, the piston 32 comes to the top dead center-position (or the position where the engine friction torque is at its maximum). However, the phase of poles 13 designed to stop and restrain salient poles 26 is not limited to U-phase, and can be any one of the U-phase, V-phase and W-phase. Even in such a case, when the engine is started, the adjacent phase is excited, and the starter 1 is started with maximum torque (V-phase stop→U-phase start, W-phase stop→V-phase start).

Furthermore, in the above example, the number of poles 13 of the starter 1 is 6, and the number of salient poles 26 is 4. However, the numbers of poles 13 and salient poles 26 are not limited to those. In addition, the starter 1 is an inner rotor-type electric motor where a rotor is disposed inside the stator in such a way as to freely rotate relative to the stator. The present invention can also be applied to an outer rotor-type electric motor in which a rotor is disposed outside a stator in such a way as to freely rotate relative to the stator.

The above starter 1 can function not only to start the engine but also as a power generator. For example, when the rotor rotates and the salient poles 26 are aligned with the poles 13, electricity is instantaneously supplied to the coils 15 of those poles 13. Owing to the electricity, magnetic flux is generated at the coils 15. But the magnetic flux is cut by the freewheeling salient poles 26 and induced current emerges at the coil 15. Accordingly, if the above operation is conducted when the accelerator is off, power-generation action occurs, causing a braking force on the engine (regeneration brake). In this case, in the SR motor, no magnet is used in the rotor. Therefore, the weight is small, with no effect on depletion of rare earth resources. When the engine is accelerated (when no electricity is flowing through coils), no power-generation action would occur, thereby putting little burden on the engine and improving the gas mileage. Since the device is made only from steel material, it is high in strength and suitable for severe usage conditions.

INDUSTRIAL APPLICABILITY

In the above-described control example, the present invention is applied to the stopping and restarting of the engine of an idling-stopped vehicle. The present invention can also be applied to the stopping and starting of the engine of a vehicle that does not feature such an idling-stop.

The present invention can be applied not only to the engine starter system with the SR motor, but also widely applied to starter systems with motors that can control where a rotor is stopped. For example, the present invention can be applied to starter systems using motors that can stop and retain a rotor at a predetermined location, such as stepping motors or synchronous reluctance motors that have slits in a rotor, form d-q axis and are driven only by reluctance torque.

EXPLANATION OF REFERENCE SYMBOLS

1: Starter
2: Engine
11: Stator
12: Yoke
13: Pole
13U: U-phase pole
13W: W-phase pole
14: Slot
15: Coil
15U: U-phase coil
15V: V-phase coil
15W: W-phase coil
21: Rotor
22: Rotor core
23: Rotor body
24: Crank journal
25: Attachment bolt
26: Salient pole
26a to 26d: Salient pole
31: Crank shaft
32: Piston
33: Cylinder block
34: Cylinder bore
35: Crank arm
36: Counter weight
37: Crank pin
38: Connecting rod

The invention claimed is:

1. An engine starter system for starting an engine using an SR motor, wherein
the SR motor includes a stator, which has a plurality of poles and coils wound around each of the poles, and a rotor, which is disposed in such a way as to share an axis with the stator;
the rotor is connected to a crank shaft of the engine and rotates in sync with the crank shaft;
the rotor and the crank shaft are connected together in such a way that when a piston of the engine is at a top dead center or slightly beyond the top dead center, a predetermined pole faces a predetermined location of the rotor,
the coils are phase coils of multiple phases through which currents of different phases are supplied; and
when the engine is stopped, electricity is supplied to only one phase of the phase coils so that the predetermined salient pole is stopped facing the predetermined pole, thereby letting the piston stop at a top dead center or slightly beyond the top dead center.

2. The engine starter system according to claim 1, wherein when the engine is started, electricity is supplied to the coil that is different from the coil through which electricity is supplied when the engine is stopped.

3. The engine starter system according to claim 1, wherein the poles are mounted in such a way as to protrude toward a radial-direction inner side of the stator;
the rotor is disposed inside the stator and has a plurality of salient poles protruding toward a radial-direction outer side; and
when the piston of the engine is at a top dead center or slightly beyond the top dead center, a predetermined salient pole faces a predetermined pole.

4. The engine starter system according to claim 1, wherein when the engine is started, electricity is supplied to an adjacent coil of a different phase from the phase coil through which electricity is supplied when the engine is stopped.

5. An engine starter system for starting an engine using an SR motor, wherein
the electric motor includes a stator, which has a plurality of poles and coils wound around each of the poles, and a rotor, which is disposed in such a way as to share an axis with the stator;
the rotor is connected to a crank shaft of the engine and rotates in sync with the crank shaft;
the rotor and the crank shaft are connected in such a way that an output torque of the electric motor comes to its maximum at a maximum pass-over torque position of the engine,
the coils are phase coils of multiple phases through which currents of different phases are supplied; and
when the engine is stopped, electricity is supplied to only one phase of the phase coils so that the rotor comes to a halt at a position corresponding to a maximum pass-over torque position of the engine.

6. The engine starter system according to claim 5, wherein when the engine is started, electricity is supplied to the coil that is different from the coil to which electricity is supplied when the engine is stopped.

7. The engine starter system according to claim 5, wherein when the engine is started, electricity is supplied to the phase coil of a different phase from the phase to which electricity is supplied when the engine is stopped, so that an output torque of the electric motor comes to its maximum.

\* \* \* \* \*